Feb. 9, 1971  TAKEO SEKI ET AL  3,561,840
PROJECTION SCREEN

Filed June 3, 1968  2 Sheets-Sheet 1

INVENTORS
TAKEO SEKI
MASUO FUKUMURA
HAJIME FUKKE

BY Craig & Antonelli
ATTORNEYS

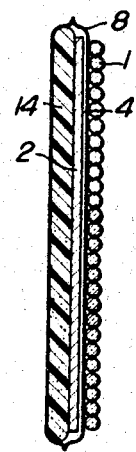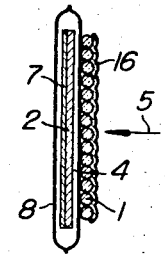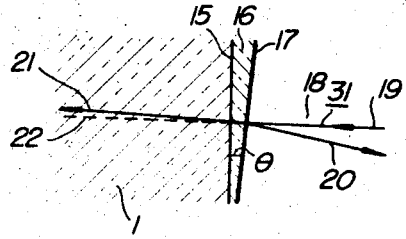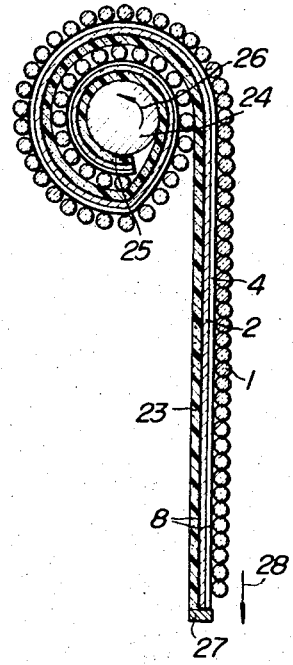

United States Patent Office 3,561,840
Patented Feb. 9, 1971

3,561,840
PROJECTION SCREEN
Takeo Seki and Masuo Fukumura, Kokubunji-shi, and Hajime Fukke, Tokyo, Japan, assignors to Hitachi, Ltd., Tokyo, Japan, a corporation of Japan
Continuation-in-part of application Ser. No. 686,550, Nov. 29, 1967, now Patent No. 3,510,197. This application June 3, 1968, Ser. No. 734,165
Claims priority, application Japan, Dec. 22, 1967, 42/81,867
Int. Cl. G03b 21/60
U.S. Cl. 350—128       5 Claims

ABSTRACT OF THE DISCLOSURE

Parallel transparent rods are bonded to each other and to a transparent film. The film's other side is bonded to a diffused reflection sheet but is separated by a microscopic air gap. Paste dot between the film and the reflecting sheet provide the gap.

CROSS-REFERENCE TO RELATED APPLICATION

This application is a continuation-in-part of U.S. patent application Serial No. 686,550 filed on Nov. 29, 1967, now Patent No. 3,510,197.

BACKGROUND OF THE INVENTION

This invention relates to a projection screen used for motion pictures, large screen television and the like.

Generally such a screen with a light reflecting surface of perfectly diffused nature has been heretofore employed for use with motion pictures, large screen television and the like. Although such prior art projection screen was advantageous in that a picture projected thereon could be satisfactorily viewed from various angular positions over a very wide range, it was disadvantageous in its poor degree of utilization of light because of the fact that the light was diffusely reflected in a wide direction. Such a defect was a big obstacle to an attempt to readily project the desired picture on the screen without darkening the room, and there remained an ever-increasing demand for a successful solution of the above problem.

The defect pointed out hereinbefore might be solved by employing various means, one of these is to increase the intensity of light emitted from an associated projector and another is to provide a new screen with a directivity in its light reflecting property. The latter means has been found worthy of special attention because it can easily be practised at lower cost than the former means.

The structure of a known projection screen provided with such a light reflection directivity comprises a sheet having a light reflecting surface of a substantially perfectly diffusible nature and a multiplicity of glass rods of transparent material having a substantially circular cross-section which are horizontally parallelly disposed on the light reflecting surface of the sheet. In the projection screen having such a structure, the light rays emitted from a projector impinge against the glass rods, and are refracted by the surfaces of the glass rods so that they are concentrated on the reflecting surface of a substantially perfectly diffusible nature. The light rays are then diffusely reflected at the light reflecting surface and transmitted back through the glass rods to the eyes of viewers. By virtue of the fact that the glass rods are horizontally disposed in parallel with each other as described above, there is no directive light reflection in the horizontal direction and only a vertical directive light reflection may be observed. Therefore, a satisfactory improvement in use of light can thereby be attained.

However, the above described projection screen has still been defective in two points namely that the efficiency of reflection cannot be improved over a certain limit, and that luminant straight lines may appear on the projection screen, thus obstructing a proper viewing of the picture. The former defect is considered to result from the fact that a portion of the light rays diffusely reflected at the reflecting surface is repeatedly subjected to the total reflection in the respective rods and is thereby extinguished, while the latter defect is considered to result from the fact that the light rays emitted onto the screen from the projector cause specular reflection at a point on the surface of each of the plural glass rods so that the light rays of specular reflection enter the eyes of viewers.

SUMMARY OF THE INVENTION

The present invention contemplates the provision of a new projection screen in which light rays are reflected with a poor directivity in one plane direction while they are reflected with sharp directivity in another plane direction perpendicular with respect to said one plane.

It is an object of the present invention to provide a new projection screen which avoids any reduction in its efficiency of light reflection.

Another object of the present invention is to provide a new projection screen which obviates such an undesirable appearance of luminant straight lines on the projection screen obstructive to the proper viewing of a picture being projected on the screen.

A further object of the present invention is to provide a new projection screen which can easily be wound on a mandrel for the convenient preservation thereof and which can satisfactorily attain the first and second objects described above.

In order to attain the above-mentioned objects, a projection screen according to the present invention comprises a diffused light reflection sheet having a diffusely light reflecting surface; a transparent film mounted upon the diffused light reflection sheet so that there may be provided a microscopic intermediate air gap between said transparent film and the diffusely light reflecting surface of said diffused light reflection sheet; and a multiplicity of cylindrical rods of transparent material bonded in parallel to each other on the outer surface of said transparent film.

Further, the inventive projection screen may be improved in that said rods are coated with a transparent film having a minute rippled surface with gentle slopes.

Furthermore, the inventive projection screen may be improved in that said diffused light reflection sheet and said transparent film are made of flexible materials, that said multiple rods are bonded to the transparent film separable from each other, and that a support member of elastic material is preferably provided on the reverse side of said diffused light reflection sheet.

BRIEF DESCRIPTION OF THE DRAWINGS

FIGS. 6 to 10 are schematic vertical sectional views showing other preferred embodiments according to the present invention;

FIG. 11 is a schematic view illustrating the principle of the present invention for the purpose of preventing specular reflection; and FIG. 12 is a schematic vertical sectional view of a further embodiment of the present invention.

DESCRIPTION OF THE PREFERRED EMBODIMENTS

Figure 1:
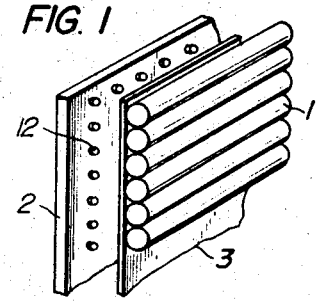
FIG. 1 is a schematic perspective view of a preferred embodiment of the present invention.
Figure 2:
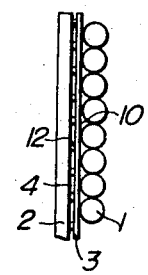
FIG. 2 is a side view of the embodiment shown in FIG. 1.

Referring now to FIGS. 1 and 2, a diffused light reflection sheet 2 is prepared by coating a pure white pigment, such as, for example, $M_gF_2$, $M_gO$ or $B_aSO_4$, on one surface of a base sheet such as, for example, a thick sheet of paper or a board of metal so that the reflection sheet may possess a light reflecting surface.

On such light reflecting surface of the reflection sheet 2, a transparent film 3, such as, for example, polyethylene is mounted by a plurality of paste dots 12 which are provided on the reflecting surface with a microscopic air gap 4 therebetween, and further on the outer surface 10 of the transparent film 3 a multiplicity of circular cylindrical rods 1 are bonded by a transparent adhesive so as to substantially cover the reflecting surface of the reflecting sheet 2.

Figure 3:
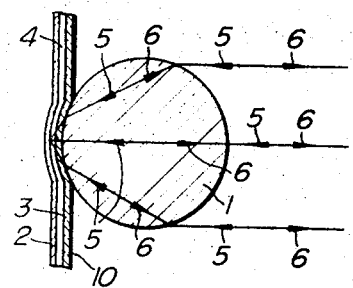
FIG. 3 is a schematic vertical sectional view illustrating the principle of the present invention for eliminating a loss of light.

FIG. 3 is an enlarged vertical sectional view of a part of the projection screen of FIG. 1 for illustrating the principle of the present invention for the obviation of a loss of light. From the structure shown in FIG. 3 it will be understood that the diffused light reflection sheet 2 stuck to the transparent film 3 is in contact with the transparent film 3 with a microscopically thin intermediate air gap 4 interposed therebetween, and also that on the transparent film 3 is substantially integrally bonded a multiplicity of circular cylindrical rods 1 of transparent material by the transparent adhesive. Accordingly, incident light rays 5 substantially parallelly transmitted to various surface points on the rod 1 are concentrated by the transparent rod 1 through a thin air gap 4 onto the light reflecting surface of the diffused light reflection sheet 2 to illuminate the same with a high degree of illumination, and the reflected light rays 6 of a high brightness are led on their return path through the thin air gap and the transparent film 3 to enter the transparent rod 1. In this light reflection mechanism, it should be specifically noted that loss of light by the repetition of total reflection can hardly occur because of the presence of the air gap 4.

Figure 4:
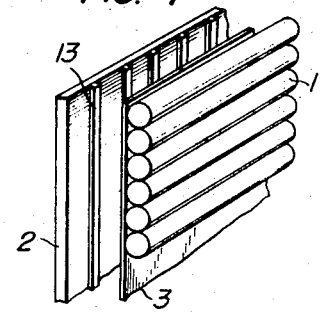
FIGS. 4 and 5 are perspective views showing other preferred embodiments according to the present invention.
Figure 5:
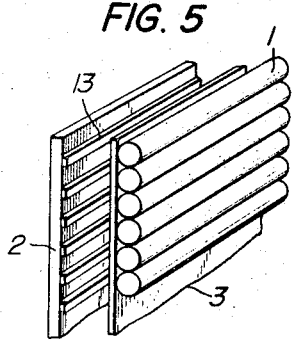

As modifications of the embodiment including provision of paste dots on the reflecting surface, paste stripes 13 may be arranged lengthwise on the reflecting surface as shown in FIG. 4, or horizontally on the reflecting surface as shown in FIG. 5. In these embodiments of the projection screen, it is preferable to decrease the amount of the paste provided on the reflecting surface as much as possible, to make the shape of the paste as slender as possible and to form the pattern of the paste as uniformly geometrical as possible.

Figure 6:
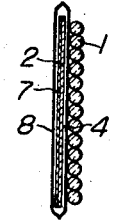
Figures 7, 8:
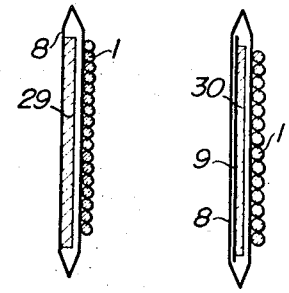

Further, the transparent film 3 may be formed to be an airtight bag as shown in FIGS. 6 to 8. In FIG. 6, the reflection sheet 2 is inserted in the bag and almost all the air in the bag which encloses the reflection sheet 2 therein is evacuated and thereafter the evacuated bag is airtightly sealed, so that the external atmospheric pressure urges the transparent film of the bag to cover the diffused light reflecting surface of the light reflection sheet 2 with a microscopic air gap 4 therebetween. On the outer surface of the transparent film, a multiplicity of transparent rods 1 are bonded by a transparent adhesive.

The above structure is advantageous in that an undesirable deterioration of the diffusely light reflecting surface of the diffused light reflection sheet 2 due to contact with dust or moisture cannot occur in any way. As a reinforcement 7 for the reflection sheet 2, any suitable member can be employed and it is preferred to laminate a sheet of soft and elastic material, such as foamed polyethylene or foamed polyurethane, on the rear side of the diffused light reflection sheet 2.

The diffused light reflection sheet 2 may alternatively be substituted by a coating 29 of a white pigment of the kind described above provided on the inner surface of one side portion of the transparent film which opposes the portion on which the rods 1 are bonded at the outer surface thereof, as shown in FIG. 7, or by a relatively thin coating 30 of the white pigment on a thin sheet material 9 such as aluminum foil having a high index of specular reflection as shown in FIG. 8.

Another embodiment of the invention is shown in FIG. 9. In FIG. 9, a compressed continuous sheet 14 of foamed polyurethane is enclosed in conjunction with the light reflection sheet 2 on the reverse side opposite to the reflecting surface thereof in an evacuated bag 8 of polyethylene as described here above so that the force of expansion of the foamed polyurethane sheet 14 caused by its compression is utilized to urge and compress the diffused light reflection sheet 2 toward the transparent film 8 and the transparent rods 1. Such a structure is advantageous in that, even if external air might enter the evacuated polyethylene bag 8 with the lapse of time, such air is first absorbed by the expansion of the compressed polyurethane sheet 14, and since the internal air pressure of the bag 8 is lower than the external air pressure so long as the expansive pressure of the foamed polyurethane sheet 14 exists, the thin air gap 4 between the transparent film 3 of the bag 8 and the diffusely light reflecting surface of the diffused light reflection sheet 2 can be maintained at a microscopic distance, and the distance of the air gap 4 can be made uniform throughout the length of the projection screen. The structure described above is further advantageous in that a simple air exhaust procedure including applying an external pressure on the polyethylene bag 8 and purging the air in the bag 8 while compressing the foamed polyurethane sheet 14 can easily and effectively attain the desired air exhaust operation. In this embodiment, the polyurethane sheet 14 with continuous foam therein is shown as extending continuously all over the back face of the diffused light reflection sheet 2, but it will be understood that the polyurethane sheet 14 is not necessarily provided all over the back face of the diffused light reflection sheet 2 but it may be alternatively provided only at portions of said back face so that the expansive force thereof may urge the film of the bag 8 to compress the diffused light reflection sheet 2.

Further, if it is required to provide a reinforced projection screen it will be well understood that the transparent rods 1 of the projection screens shown hereinabove may be mechanically strengthened by bonding them to each other in order to integrally combine the rods 1 as an assembly in a plate-like form.

The second of the mentioned objects of the present invention can be attained by another embodiment as shown in FIG. 10 which provides the surfaces of circular cylindrical rods 1 of transparent material of the embodiment of FIG. 6 with a coating 16 of such a material, for example, as epoxy resin cured by amine or dogtooth violet which is preliminary dissolved in warm water and then used by cooling to room temperature, so as to provide a transparent filmy coating having a minute rippled surface with gentle slope. In the above structure, a microscopic intermediate air gap 4 is interposed between the diffusely light reflection surface of the diffused light reflection sheet 2 and the transparent rods 1. When now a light ray 5 emitted from a projector reaches the projection screen, that portion of the light ray which is reflected by the surface of the screen is subjected to irregular reflection through the presence of the transparent film 16 having the minutely but gently rippled surface and cannot be observed as a luminant line, while that portion of the light ray which penetrates into the screen is effectively subjected to diffused reflection by the diffusely light reflecting surface of the diffused light reflection sheet 2 as described in detail with reference to FIG. 3. Further, since the loss of light in the rods 1 of transparent material hardly occurs by virtue of the interposition of the microscopic air gap 4, the projection screen of the present invention can stably give a higher brightness than prior art projection screens. The structure of the diffused light reflection sheet 2 is in no way limited to that referred to in the embodiment of FIG. 10, but it will be apparent that any one of the structures described with regard to the illustration of the principle of the present invention may be employed in lieu thereof.

Since the surface of such a filmy coating is in the form of minute ripples with gentle slope, irregular reflection of light occurs at the surface of the rods so that the luminant lines disturbing a proper viewing can be rendered substantially harmless as a matter of fact. According to the present invention the path of light entering the rods of transparent material such as glass is not appreciably affected by the presence of the minute ripples with gentle slopes on the surface of the transparent coating provided to cover the rods, and therefore the satisfactory reflection directivity required for a projection screen is not disturbed at all in spite of the presence of such coating as will be described in detail with reference to FIG. 11.

FIG. 11 is an enlarged sectional view of the surface portion of the rod for illustrating the principle of the present invention in regard to the obviation of undesirable specular reflection. In FIG. 11, a surface 15 of a rod 1 of transparent material is shown as being coated with a transparent film 16 having a minute rippled surface 17 with a gentle slope. Assuming now that the intersecting angle $\theta$ between the surface 15 of the rod 1 and the surface 17 of the film 16 is quite small, wherein a light ray 31 is transmitted from a direction 19 through an ambient air layer 18 to the rod surface 15 in a substantially perpendicular relation with respect thereto, most of the light ray may proceed in the direction shown by the dotted line 22, and the remainder may be reflected in the direction opposite to arrow 19, but where there is provided a film 16 on the surface 15 of the rod 1, the reflected portion of the light ray having impinged in the same manner as described above may proceed in a direction 20 which is displaced by double the angle, $2\theta$, from the direction 19. Further, suppose that the transparent rod 1 and the transparent film 16 have a common index of refraction N, the transmitting portion of the light ray which passes through the transparent film 16 and the transparent rod 1 is only slightly displaced in a direction 21 by a relatively small angle $$\left(1 - \frac{1}{N}\right)\theta$$

from its normal penetrating direction 22. It is thus possible to sufficiently diffuse the reflected light and to render the path of the transmitting light substantially unvariable. Therefore, the luminant lines that may appear on the projection screen can be rendered substantially harmless as a matter of practical use, and the satisfactory reflection directivity required for the projection screen can be substantially maintained even with the presence of such a transparent film 16. A frosting technique may be employed as another method for providing a diffused light reflection property on the surface of the transparent rods 1. But if the transparent rods 1 are processed by the above technique, the path of transmitted light is relatively largely deviated and thereby the satisfactory reflection directivity desired for the projection screen is deteriorated, because the surface so processed has minute ripples thereon with very steep slopes. According to another method, a quarter wavelength film may be provided on the surface of the transparent rod 1 to prevent undesirable specular reflection, but this method is economically unacceptable in view of the high cost involved. There may be various other materials and methods used for obtaining such a transparent film, than these of the present invention, but a transparent film commonly obtained from such materials by such methods has, in many cases, a smooth surface which produces undesirable specular reflection. The materials employed in the present invention for preparing the transparent film or coating 16 the surface of which is provided with minute ripples with gentle slopes, are preferably epoxy resin cured by amine or a kind of starch of dogtooth violet, the surface tension of which is relatively small and the fluidity of which is relatively quickly lost before it solidifies.

FIG. 12 is a schematic vertical sectional view of a further embodiment of the present invention which is especially suitable for the attainment of the third object described previously. The projection screen shown in FIG. 12 comprises a multiplicity of parallelly disposed, circular, cylindrical rods 1 of transparent material which are separable from each other by folding the screen, a diffused light reflection sheet 2, a bag 8 formed of a transparent and airtight film and including therein the diffused light reflection sheet 2, a microscopic air layer 4 intervening between one side of the bag 8 and the diffusely light reflecting surface of the diffused light reflection sheet 2, and a sheet 23 of elastic material such as, for example, foamed polyurethane. The projection screen having a structure as described above is shown as being wound around a mandrel 24. The diffused light reflection sheet 2 may be obtained by coating a pure white pigment such as, for example, $M_gF_2$, $M_gO$ or $B_aSO_4$ on a sheet of cloth, and the transparent rods 1 which may be of glass are bonded by a transparent adhesive to the outer surface of the bag 8 on the side opposite to the diffusely light reflecting surface of the diffused light reflection sheet 2. The elastic sheet 23 is bonded to the outer surface of the bag 8 on the side which is remote from the side having thereon the transparent rods 1. The elastic sheet 23 is securely fixed at its top end 25 or at a portion adjacent to the top end 25 to the mandrel 24 by an adhesive.

The projection screen having a structure as described above can easily be taken up by the mandrel 24 when the mandrel 24 is merely rotated in a direction shown by the arrow 26, because both the foamed polyurethane sheet 23 and the diffused light reflection sheet 2 are satisfactorily flexible and the transparent rods 1 are separable from each other. The projection screen wound around the mandrel 24 can easily be stretched to its straightly extended position by merely pulling the lower end 27 of the projection screen in the direction shown by the arrow 28.

In the embodiment described above, an elastic sheet made of polyurethane is employed by way of example, but it will be understood that the elastic sheet in the present invention is in no way limited to such a specific material and any other elastic sheet such as, for example, a sponge rubber sheet or a foamed polyethylene sheet may be employed in lieu thereof.

It will be understood that the structure illustrated in FIG. 12 gives a projection screen which can easily be wound around a mandrel, for the convenient preservation thereof, and which attains the first object and second object of the present invention.

It will be appreciated from the foregoing detailed description that the present invention provides a projection screen which is an improvement over the prior art screen in that a novel principle is applied to the past invention. The projection screen according to the present invention, when disposed in an appropriate position and utilized for picture projection purposes, can exhibit such a marked effect that all the viewers accommodated in a substantially fixed plane can properly see a brighter picture than heretofore without being disturbed by the light of specular reflection, without any wasteful loss of brightness and without any variable stability in brightness.

It is to be understood that the rods of transparent material referred to in the specification are not in any way intended to designate only those having a substantially circular cross-section illustrated hereinbefore but are intended to include a plate of optically transparent material having a multiplicity of horizontally juxtaposed lenticular projections on both the front and rear surface thereof, a plate of optically transparent material having a multiplicity of horizontally juxtaposed lenticular projections solely on the front surface thereof, and the like.

What is claimed is:

1. A projection screen comprising: a diffused light reflection sheet having a diffusely light reflecting surface; a transparent film arranged in parallel with said reflection sheet for covering the diffusely light reflecting surface of said diffused light reflection sheet, and associated with said diffused light reflection sheet with a microscopic intermediate air gap therebetween; and a multiplicity of rods of transparent material bonded in parallel to each other on the outer surface of said transparent sheet to oppose the diffusely light reflecting surface of said diffused light reflection sheet through said transparent film.

2. A projection screen according to claim 1, in which said multiplicity of rods of transparent material have a surface with minute ripples of gentle slopes respectively.

3. A projection screen comprising: a diffused light reflection sheet having a diffusely light reflecting surface; a transparent film arranged in parallel with said diffused light reflection sheet for covering the diffused light reflecting surface of said diffused light reflection sheet; means for mounting said transparent film upon said diffused light reflecting sheet in such a relationship that said transparent film is spaced from the diffusely light reflecting surface of said diffused light reflection sheet with a microscopic intermediate air gap therebetween; and a multiplicity of rods of transparent material bonded in parallel to each other on the outer surface of a portion of said transparent sheet.

4. A projection screen according to claim 3, in which said mounting means comprises paste dots laid scattered on said diffused light reflecting surface of said diffused light reflection sheet.

5. A projection screen according to claim 3, in which said multiplicity of rods of transparent material have a surface with minute ripples of gentle slopes respectively.

References Cited
UNITED STATES PATENTS

| | | | |
|---|---|---|---|
| 1,998,054 | 4/1935 | McBurney | 350—126 |
| 3,173,332 | 3/1965 | Thompson | 350—128 |

JOHN M. HORAN, Primary Examiner

M. D. HARRIS, Assistant Examiner

U.S. Cl. X.R.

350—129